United States Patent
Thorwarth (10) Patent No.: US 10,696,339 B2
(45) Date of Patent: Jun. 30, 2020

(54) MANUFACTURING STATION, MANUFACTURING PLANT AND METHOD

(71) Applicant: KUKA SYSTEMS GMBH, Augsburg (DE)

(72) Inventor: Paul Thorwarth, Augsburg (DE)

(73) Assignee: KUKA SYSTEMS GMBH, Augsburg (DE)

(*) Notice: Subject to any disclaimer, the term of this patent is extended or adjusted under 35 U.S.C. 154(b) by 329 days.

(21) Appl. No.: 15/123,862

(22) PCT Filed: Mar. 6, 2015

(86) PCT No.: PCT/EP2015/054705
§ 371 (c)(1),
(2) Date: Sep. 6, 2016

(87) PCT Pub. No.: WO2015/132378
PCT Pub. Date: Sep. 11, 2015

(65) Prior Publication Data
US 2017/0015373 A1    Jan. 19, 2017

(30) Foreign Application Priority Data

Mar. 6, 2014 (DE) .................. 10 2014 102 990
Mar. 6, 2014 (DE) .................. 20 2014 101 003 U (51) Int. Cl.
*B62D 65/02* (2006.01)
*B23P 21/00* (2006.01)
(Continued)

(52) U.S. Cl.
CPC .......... *B62D 65/022* (2013.01); *B23P 21/004* (2013.01); *B23Q 7/14* (2013.01);
(Continued)

(58) Field of Classification Search
CPC ............ G05B 19/418; G05B 19/41815; G05B 19/41845; G05B 19/4189; G05B 19/41895; B23P 21/004; B23P 2700/50; B23Q 7/14; B23Q 7/1405; B23Q 7/1415; B23Q 7/1421; B62D 65/022; B62D 65/18; B65G 35/00; B65G 37/00; B65G 2812/99;
(Continued)

(56) References Cited

U.S. PATENT DOCUMENTS 5,218,550 A * 6/1993 Kato ...................... B25J 9/1692
                                                              700/192
5,539,975 A    7/1996 Kukuljan et al.
(Continued)

FOREIGN PATENT DOCUMENTS

CN    102114594 A    7/2011
DE    36 14 165 A1    10/1987
(Continued)

*Primary Examiner* — Matthew P Travers
(74) *Attorney, Agent, or Firm* — McGlew and Tuttle, P.C.

(57) ABSTRACT

A manufacturing plant (1) includes a plurality of mutually uniform modular manufacturing stations (2) which are arranged in a station matrix (5) and are interlinked for conveying by a conveyor device (16) and a path network (17). The manufacturing stations (2) are modular and include a plurality of integrated manufacturing cells (7,8) and each has its own process area (9).

16 Claims, 6 Drawing Sheets

(51) Int. Cl.
*G05B 19/418* (2006.01)
*B23Q 7/14* (2006.01)

(52) U.S. Cl.
CPC .... *G05B 19/41895* (2013.01); *B23P 2700/50* (2013.01); *G05B 19/41815* (2013.01); *G05B 19/41845* (2013.01)

(58) Field of Classification Search
CPC ......... Y10T 29/49829; Y10T 29/53365; Y10T 29/534; Y10T 29/53539–53548; Y10T 29/53048
See application file for complete search history.

(56) References Cited

U.S. PATENT DOCUMENTS

| | | | |
|---|---|---|---|
| 7,770,780 B2 | 8/2010 | Monti et al. | |
| 2001/0003861 A1* | 6/2001 | Mayr | B23P 21/004 29/407.04 |
| 2002/0100159 A1* | 8/2002 | Swartz | B23P 21/004 29/430 |
| 2007/0199929 A1* | 8/2007 | Rippl | B23K 26/04 219/121.78 |
| 2008/0189939 A1 | 8/2008 | Kraus et al. | |
| 2011/0258837 A1* | 10/2011 | Scannon | G05B 19/4188 29/592 |
| 2012/0318954 A1 | 12/2012 | Overley et al. | |
| 2013/0190915 A1* | 7/2013 | Choo | G05B 19/4189 700/113 |
| 2015/0165566 A1* | 6/2015 | Negre | B23K 37/047 414/222.13 |
| 2015/0227140 A1* | 8/2015 | Douglas | G05D 1/0217 701/23 |
| 2016/0313740 A1* | 10/2016 | Deutscher | G05D 1/0236 |

FOREIGN PATENT DOCUMENTS

| | | |
|---|---|---|
| DE | 694 02 086 T2 | 10/1997 |
| DE | 10 2004 029665 A1 | 10/2005 |
| DE | 20 2005 003 913 U1 | 8/2006 |
| DE | 20 2007 002 365 U1 | 6/2008 |
| DE | 20 2007 015 654 U1 | 3/2009 |
| DE | 10 2007 058 432 A1 | 6/2009 |
| DE | 20 2008 012602 U1 | 3/2010 |
| EP | 1 568 582 A2 | 8/2005 |
| EP | 1 775 066 A1 | 4/2007 |
| EP | 2 340 982 A1 | 7/2011 |
| EP | 2 137 053 B1 | 11/2013 |
| WO | 2013/083142 A1 | 6/2013 |
| WO | 2013/167184 A1 | 11/2013 |
| WO | 2013/168706 A1 | 11/2013 |

* cited by examiner

MANUFACTURING STATION, MANUFACTURING PLANT AND METHOD

CROSS REFERENCE TO RELATED APPLICATIONS

This application is a United States National Phase Application of International Application PCT/EP2015/054705 filed Mar. 6, 2015, and claims the benefit of priority under 35 U.S.C. § 119 of German Applications 10 2014 102 990.9 filed Mar. 6, 2014 and 20 2014 101 003.3 filed Mar. 6, 2014, the entire contents of which are incorporated herein by reference.

FIELD OF THE INVENTION

The present invention pertains to a manufacturing station for workpieces, especially vehicle body parts, a manufacturing plant and a method.

BACKGROUND OF THE INVENTION

Manufacturing stations in the form of robot gardens are known from practice, wherein a number of individual robot cells are arranged in a row and are connected to one another in series by a fixed interlinking and jointly operated workpiece storage sites.

SUMMARY OF THE INVENTION

An object of the present invention is to provide an improved manufacturing technology.

The manufacturing technology according to the invention, i.e., the manufacturing station, the manufacturing plant and the manufacturing method, offer greater flexibility for the processes to be carried out in a manufacturing station. The effort needed to set up and adapt a manufacturing station to the processing process to be carried out there can also be significantly reduced. In addition, advantages arise for a better and more flexible interlinking of manufacturing stations with one another.

The manufacturing technology is especially suitable for use in the manufacture of vehicle bodyshells. It offers maximum variability for this along with reduced efforts needed for manufacture and control. The concept of a manufacturing plant comprising a plurality of manufacturing stations is also substantially simplified and improved in respect to costs as well as the efforts needed for control and time.

The manufacturing station according to the invention may have a process-neutral and cycle time-neutral basic configuration as well as a basic programming. It can be adapted to the particular one or more manufacturing processes to be performed internally within the station in a simple manner and rapidly. It may be sufficient for this to use an adapted process tooling on the basis of the basic configuration and to set up a process programming on the basic programming. The manufacturing station can acquire as a result a quantifiable process potential in a defined cycle time. This potential can also be changed again, if needed, rapidly, at a low cost and in a simple manner.

The design embodiment of the assembly station according to the invention is advantageous for uniformization and standardization. The integration of a plurality of, especially two, manufacturing cells with a shared and variable conveying logistics in a manufacturing station has special advantages for this. In particular, the process area in the manufacturing cells is made uniform and can be adapted to the particular process requirements rapidly and in a simple manner.

Due to a uniform receiving device and robot workplaces provided on the periphery thereof, a variable process potential, which can be adapted, when needed, to the requirements of the process, can be provided in a simple manner. In particular, the programming effort can be reduced for this. The position can be preset uniformly at the plurality of, e.g., four robot working sites for an industrial robot that is to be arranged there when needed. The location references of the robot to the receiving device are made uniform and preset, so that the programming effort for the process-related motions of the robot is also simplified.

The manufacturing stations, whose basic configuration is uniform and is adapted only to the particular needs of the process, may be arranged in a station matrix and interlinked with one another in a flexible manner via a corresponding conveyor device. The hard coding hitherto common in the manufacture of bodyshells and the rigid interlinking of individual cell-like manufacturing stations can be abandoned in favor of a flexible matrix bodyshell.

The manufacturing technology according to the invention also offers the advantage of short conveying paths and uniform or standardized input and output interfaces of the manufacturing stations, in addition to the flexibility of conveying and of interlinking. This makes it possible to use an automated and programmable conveyor device, preferably with individually driven and individually controllable conveying devices. The flexible conveyor device and station interlinking has, in addition, the advantage that in case of failure of one manufacturing station, e.g., due to a malfunction, overload or the like, the other manufacturing stations in the station matrix are not affected or are not substantially affected and are able to continue to operate. Downtime of the entire manufacturing plant, as it happens in case of the current hard-coded and permanently interlinked manufacturing stations in the state of the art, can be avoided.

The embodiment of the manufacturing stations according to the invention offers, in addition, the possibility of varying the process contents and of a possibility of uncoupling from the manufacturing cycle. Thanks to the plurality of integrated manufacturing cells, longer-lasting processes can be distributed internally within the station among the manufacturing cells, and an internal workpiece conveying within the station is also possible. The internal manufacturing cycle within the station can be longer as a result than the manufacturing and conveying cycle that exists internally within the station matrix and overlaps the station.

On the other hand, due to the flexibility of the process in the manufacturing cells, it is also possible to carry out manufacturing processes whose duration is shorter than that of the manufacturing cycle overlapping the station. An interim storage may take place here within the station. In addition, an individual process can be carried out in the process areas of the manufacturing cells on a workpiece or a plurality of manufacturing processes can be carried out simultaneously on identical workpieces. The uniform and standardized basic configuration of the manufacturing stations and the manufacturing cells thereof makes possible an immense variety in term of process contents, as well as the number and duration of the processes.

In addition to the uniform and standardized manufacturing stations, additional special manufacturing stations may also be integrated in a manufacturing plant. This may be, e.g., a tryout station, whose basic configuration corresponds to the uniform and standardized manufacturing stations and in which the process programming is set up with the use of the specific process tooling. This may be especially the sequence programming as well as the path programming of the industrial robots being used in the process area as well as of the conveying devices of the internal conveying logistics within the station, which conveying devices are preferably formed by a plurality of industrial robots.

The process programming can then be transmitted from the tryout station to the manufacturing station intended for the subsequent series production in a wireless manner or via a cabled data line and directly implemented there. The different manufacturing stations can be provided with program-based process contents one after another with the tryout station in case of a change or changeover of the manufacture and of the manufacturing processes. This may also happen by means of stocks of process contents, so that all manufacturing stations can be retrofitted very rapidly when changing over the manufacture in all manufacturing stations, which minimizes costly downtimes. In addition, test runs can be carried out in a time- and cost-saving manner in the tryout station.

The tryout station may be provided as a separate and additional station in the manufacturing plant. It may also be integrated in the station matrix if needed and used for series production after the end of the tryout operation.

Another special manufacturing station may be provided for a special manufacture. This may pertain to niche products, prototypes or the like. This special manufacturing station may likewise have a standardized basic configuration and a basic programming, just like the other uniform and standardized manufacturing stations and have additional components, such as a connected component supply unit or the like, for an at least partly autarchic operation. In addition, it is favorable to provide a non-stationary receiving device in the manufacturing cells. This makes possible a simplification and, if necessary, rapid retrofitting of the process area in the manufacturing cells. In addition, advantages arise for conveying logistics.

In an independent aspect of the present invention, a manufacturing plant with manufacturing stations is provided for workpieces, especially body parts, which has a plurality of manufacturing stations, which have a mutually uniform basic configuration as well as a uniform basic programming, especially a uniform PLC operating system, and are adapted to the particular process by a process tooling in their process and logistics areas as well as by a set-up process programming. In addition to this, one or more of the additional aspects mentioned below may be provided each individually or in a suitable combination.

The manufacturing stations may have mutually uniform configurations. According to the exemplary embodiments, the manufacturing stations may have a modular configuration and contain two or more manufacturing cells. As an alternative, they may have a different configuration and have, e.g., only one manufacturing cell. In addition, they may have a combined input and output interface. Further, the internal conveying logistics may be eliminated or have a different configuration. An industrial robot at the robot workplace may also carry out the feeding and release of the workplaces as well as optionally the loading and unloading of the conveying devices.

The manufacturing stations may be connected to a shared external logistics area with a conveyor device and with a path network. The manufacturing stations may be arranged and interlinked in a preferably regular station matrix. The manufacturing stations may be interlinked in the station matrix for conveying and data exchange as well as programming. The conveyor device may have automated and programmable floor-mounted conveying devices and/or track-based conveying devices, which connect the input and output interfaces of different manufacturing stations with one another and optionally with a component supply unit.

The manufacturing plant may have, in addition to the uniform manufacturing stations standardized for the series production, one or more additional manufacturing stations for special manufacture, especially prototype manufacture.

The manufacturing plant may have a manufacturing station, for the tryout, which is configured according to the uniform manufacturing stations and which is connected to the manufacturing stations in the manufacturing plant, especially in the station matrix, by data lines for transmitting the process programming.

The aforementioned flexible interlinking of the manufacturing stations pertains, on the one hand, to materials-handling technology. All manufacturing stations and the component supply unit can be reached by the conveyor device and the floor-mounted and track-based conveying devices thereof, conveying devices for short, on the path network separately and individually. The sequence in which a plurality of manufacturing stations are reached one after another by a conveying device may also be selected as desired. Further, there may be an interlinking for data exchange as well as programs. The manufacturing stations may exchange data and programs, e.g., among each other and with the conveyor device.

A manufacturing process to be carried out may extend over a plurality of manufacturing stations, e.g., in the manufacture of multipart workpieces or assembly units. A plurality of such manufacturing processes may take place simultaneously and independently from one another, e.g., in a production mix of assembly units belonging to different types, e.g., underbody groups for a limousine, a cabriolet, etc. A plurality of such manufacturing processes may, in addition, be interlinked among one another in a multistep manufacturing sequence. For example, different workpieces or assembly units, which are manufactured at first simultaneously, may be brought together now and connected into a larger assembly unit. A plurality of such manufacturing sequences may be carried out simultaneously in the manufacturing plant. These configuration possibilities pertain not only to the assembly processes mentioned as examples, but also to any desired types and even combination of processes, especially processing and handling processes.

Such a process engineering interlinking may affect all or some of the manufacturing stations. A plurality of manufacturing stations may be interlinked into one group for process engineering. A plurality of these station groups interlinked for process engineering may be present within the manufacturing plant.

The logistics area or the conveyor device may have a conveying line system, in which the automatic conveying devices move in a line-bound manner, especially between manufacturing stations interlinked for process engineering with one another and optionally with the component supply unit. It is especially favorable to divide the conveying line system into a plurality of conveying lines closed in a ring-shaped manner, in which one or more conveying devices each move in a line-bound manner and preferably in a closed circuit. These embodiment variants reduce the efforts needed for programming and control for the automatic conveying devices. The conveying devices reach only some of the total number of manufacturing stations present on their conveying line. This shortens, in addition, their travel paths and ensures better and more rapid availability of a conveying device for the particular conveying job.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, the present invention pertains to a manufacturing station (2) and to a manufacturing method for workpieces (6). The present invention pertains, further, to a manufacturing plant (1) with a plurality of such manufacturing stations (2) and to a method for configuring the manufacturing station(s) (2) and the manufacturing plant (1).

The manufacturing plant (1) has a plurality of modular and standardized manufacturing stations (2), which have a uniform basic configuration and preferably also a uniform basic programming. The uniform manufacturing stations (2) have a process-neutral and cycle time-neutral configuration in the basic configuration. On the basis of this basic configuration, they can be adapted to and configured with the one or more specific manufacturing processes to be carried out within the manufacturing station (2) in terms of devices and programming. This can be brought about especially by the use of an adapted process tooling (25, 38) and by a process programming set up on the basic programming.

Figure 1:
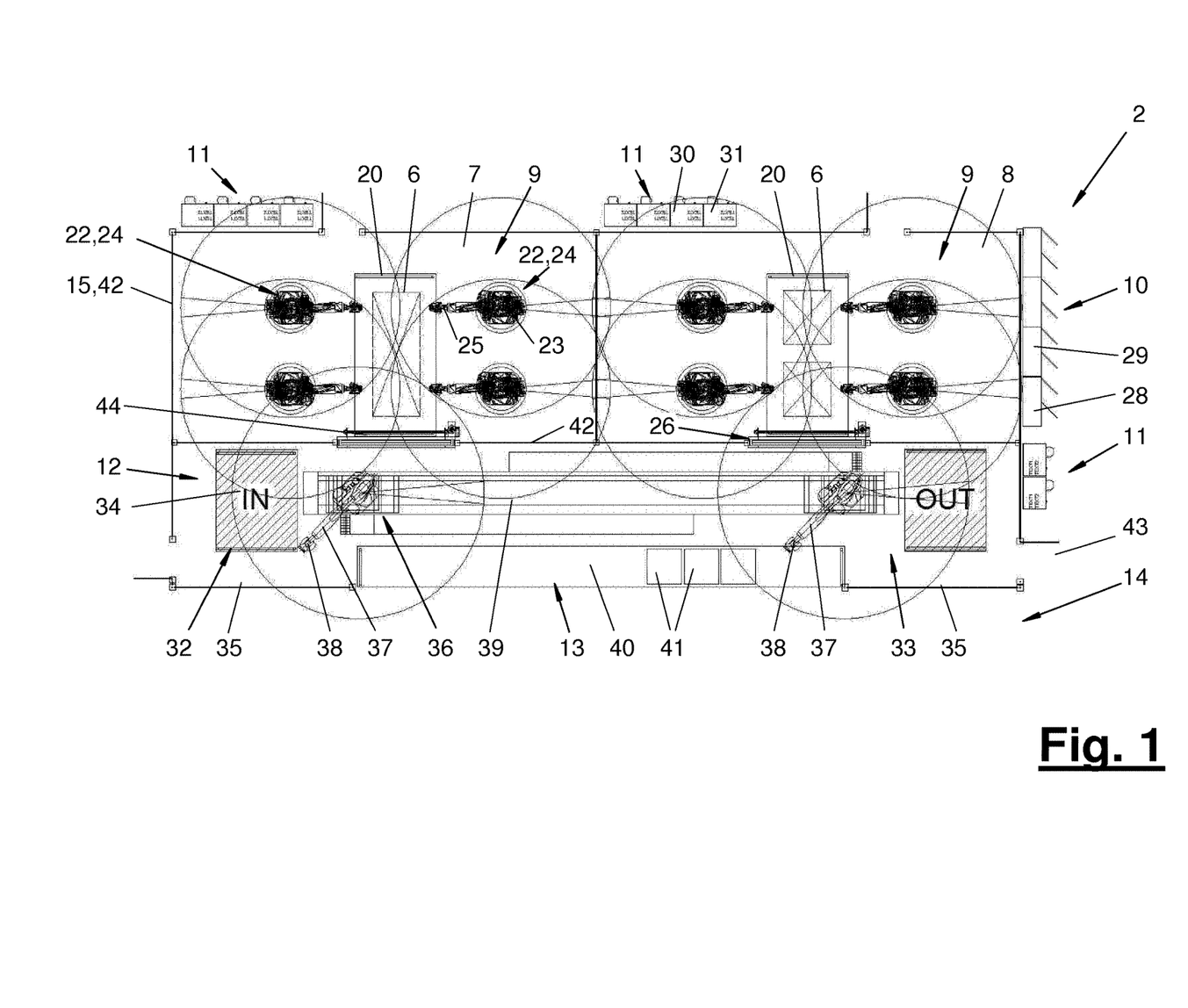
FIG. 1 is a schematic top view of a standardized manufacturing station.

FIG. 1 shows a schematic view of such a standardized manufacturing station (2) and the basic configuration thereof. The manufacturing station (2) has a plurality of, especially two integrated manufacturing cells (7, 8) with a separate process area (9) each. The process areas (9) have a mutually uniform configuration in terms of design and programming.

One or more workpieces (6), which are shown schematically in FIG. 1, are processed in the process areas (9). The workpieces (6) are preferably configured as vehicle body parts. These may consist of sheet metal or other suitable materials. The processing and manufacturing processes may be as desired. For example, they are jointing processes, especially welding or bonding processes, in which a plurality of components are joined in the workpiece or with the workpiece (6). Other possible processes pertain to the shaping, coating, machining or other processing of workpieces (6).

The manufacturing station (2) has, further, a shared internal conveying logistics (12) within the station for the workpieces (6). The conveying logistics (12) connects the manufacturing cells (7, 8) among one another and also connects them together to the surrounding area, especially an external logistics area (14).

The manufacturing station (2) may have a border (15), which surrounds the manufacturing cells (7, 8) and the internal conveying logistics (12) within the station on the outside. The border (15) may also be present internally within the station, being located between the manufacturing cells (7, 8) and the internal conveying logistics (12) within the station separating these from one another for safety. The border (15) has a wall (42), which forms a protective separation of the manufacturing station (2) to the outside and possibly also in the interior space of the station.

A plurality of accesses (26, 27, 35, 43), which can optionally be closed with controllable closures (44) and which are intended for conveying devices (36, 45, 48) and possibly for persons, may be present in the wall (42). Such closures (44) may be configured as doors or gates, especially as sliding doors. For example, closable accesses (26) may be present within the station between the respective process area (9) of the manufacturing cells (7, 8) and the internal conveying logistics (12) within the station. Accesses (43) with doors and with safety devices connected thereto may be present in the outer border (15) for the access of persons from the outside. A border (15) may be eliminated if a man-robot cooperation or collaboration (MRC) is used.

For the sake of the aforementioned uniformization, the process areas (9) have each a uniform receiving device (20) for the workpieces (6) and a plurality of robot workplaces (22), which are arranged on the periphery of the receiving device (20), especially on different and preferably opposite sides of the receiving device (20). For example, an industrial robot (23) may be arranged at the robot workplaces (22). The industrial robots (23) likewise have a uniform configuration within the manufacturing station (2). The industrial robots (23) are preferably industrial robots that have a plurality of rotatory and/or translatory robot axes in any desired number and configuration. Articulated-arm robots or bent-arm robots with five or more rotatory axes are preferably used.

The robot workplaces (22) are made uniform, e.g., by a uniform position specification (24) for an industrial robot (23) relative to the receiving device (20). The position specification may be formed, e.g., by bottom-side guide and mounting sites, which ensure a preset, accurate positioning and alignment of the industrial robot (23) arranged here. An industrial robot (23) can be arranged as a result at a robot workplace (22) as needed depending on the requirement of the process and it immediately has the accurate, preset position and alignment in relation to the receiving device (20) due to the position specification (24).

Four robot workplaces (22) each are provided on both sides of the receiving device (20) in the exemplary embodiment shown. They are located on the long sides of the preferred rectangular receiving device (20).

The process tooling (25) for adaptation of the process area (9) to the particular manufacturing process is associated with the receiving device (20), on the one hand, and with the industrial robots (23), on the other hand, and may be changed, if necessary, for adaptation to other manufacturing processes. Said basic configuration of the receiving device (20) and of the robot workplaces (22) remains the same in the process areas (9).

The process tooling (25) of the receiving device (20) comprises, e.g., support and positioning devices as well as a controllable clamping device for one or more workpieces (6). As is illustrated in FIG. 1, an individual and large workpiece (6) is processed in the manufacturing cell (7), with the receiving device (20) having a corresponding individual process tooling (25). A plurality of smaller workpieces (6) are processed in the manufacturing cell (8) next to each other on the receiving device (20), which has a correspondingly divided process tooling (25) for this. Two workpieces (6) are processed by opposite industrial robots (23) in FIG. 1. The number of workpieces may alternatively be greater, the workpieces (6) being processed by one industrial robot (23) only or by one industrial robot (23) also being able to process a plurality of workpieces (6) jointly or one after another.

The process tooling (25) of the industrial robot (23) comprises replaceable process tools, especially jointing tools or optionally also handling tools. A magazine for an automatic tool change may optionally also be arranged for this in the process area (9).

The receiving device (20) is arranged stationarily in the exemplary embodiment according to FIG. 1 and is preferably supported at and mounted on the floor of the station. The receiving device (20) is connected to the internal conveying logistics (12) of the station. The access is made possible for this by means of said access (26) with a closure (44) designed, e.g., as a sliding door.

According to FIG. 1, the manufacturing station (2) has a control area (10) with a plurality of control modules (28, 29) for the manufacturing cells (7, 8) and the internal conveying logistics (12) of the station. The control area (10) is arranged, e.g., at the outer border (15) and optionally on the outside thereof.

The manufacturing station (2) has, further, a supply area (11) with a plurality of supply modules (30, 31) for operating materials and for process media. The supply area (11) may likewise be arranged at the outer border (15) and especially on the outside thereof. The operating materials may comprise energy, especially electric power current, welding current, as well as fluids, especially compressed air, hydraulic fluid, coolant or the like. The process media may be adhesive, sealant, lacquer, powder or other, especially fluidic media for the particular manufacturing processes carried out in the manufacturing station (2).

The control and supply areas (10, 11) are made uniform and form a modular system, in which process-specific modules may be arranged as needed and also replaced. Said areas (10, 11) may have, in addition, standardized interfaces for the connection, especially line connection, with the respective process sites in the process area (9).

The control modules (28, 29) are connected to the receiving device (20) and to the robot workplaces as well as to the industrial robots (23) possibly arranged there. In addition, they are connected to the supply modules (30, 31) and to the internal conveying logistics (12) within the station as well as to the closures (44).

A control module (28) may contain, e.g., one or more robot controls. Another control module (29) may contain a sequential control, a so-called PLC control. The control modules (28, 29) may have a uniform basic programming. This may pertain especially to a uniform PLC operating system and optionally a uniform basic programming for the robot workplaces (22) and for the industrial robots (23) located there. For example, the positions and the assignments in space of the robot workplaces (22) and of the robots (23) located there to the receiving device (20) are preprogrammed in the robot programming. The above-mentioned adapted process programming can be set up on this basic programming. Corresponding software interfaces are provided for this.

According to FIG. 1, the manufacturing cells (7, 8) are arranged next to each other in a row. They have, e.g., a rectangular outline and abut against one another with their narrow sides. The internal conveying logistics (12) within the station extends along the lined-up manufacturing cells (7, 8). It is preferably located on the outside of the cells and is connected to the process areas (9) via the aforementioned accesses (26). The internal station logistics (12) of the station is arranged between the manufacturing cells (7, 8) and an outer front (13) of the manufacturing station (2). The outer front (13) faces an external logistics area (14). It is preferably aligned in parallel to and at a spaced location from the row of cells (7, 8).

The internal conveying logistics (12) of the station may have any desired and suitable configuration to make possible the aforementioned conveying functions. In the embodiment shown, it has for this a conveying device (36) for the workpieces (6), which is formed, e.g., by a plurality of, especially two, industrial robots (37) of the above-mentioned type. These are handling robots with a process tooling (38), which can be changed as needed and which is formed, e.g., by one or more gripping tools, which are adapted to the particular workpieces (6). The conveying device (36) extends along the lined-up manufacturing cells (7, 8) and has a travel axis (39) for this for the industrial robots (37). These may have a shared travel axis (39) or travel axes of their own. Two-way traffic and rerouting are possible here due to a corresponding configuration of the travel axes, so that each handling robot (37) can reach a plurality of and especially all manufacturing cells (7, 8).

The internal conveying logistics (12) of the station has, further, an input interface (32) and an output interface (33), which is functionally separated and distanced therefrom, for the separate feeding and removal of the workpieces (6). Two such interfaces (32, 33) are preferably present. As an alternative, their number may be greater and preferably an even number. In another variant, an individual combined input and output interface (32) is possible.

The interface(s) (32, 33) has/have each an access (35) on the outer front (13) for connection to the external logistics area (14) and a conveyor device (16) arranged here. The access (35) is configured as an opening in the outer border (15) and optionally has a controllable closure (44) in the form of a sliding door. The input and output interfaces (32, 33) can be approached as a result by the external conveyor device (16) independently from one another.

The conveying device (36) extends between the input and output interfaces (32, 33) and services both. The input and output interfaces (32, 33) are preferably arranged at the station edges. Thanks to the rerouting technique, they can be reached by all industrial robots (37) of the conveying device (36).

The input and output interfaces (32, 33) have each a storage site (34) for one or more workpieces (6) in a defined position and arrangement. The conveying device (36) can convey the workpieces (6) from the process areas (9) of the manufacturing cells (7, 8) to the input and output interfaces (32, 33) and back as well as to and fro between the process areas (9). Due to the internal cell logistics of the station, the one or more manufacturing processes carried out within the manufacturing station (2) can be uncoupled from the external manufacturing and conveying cycle. The connection to the external conveyor device (16) and possibly to the external conveying cycle is brought about via the interfaces (32, 33).

The internal conveying logistics (12) of the station may have, furthermore, a receiving area (40) for components at the outer front (13). The components may possibly be arranged in a set or in a multiple arrangement on one or more component carriers (41) and positioned in the receiving area (40). The receiving area (40) is accessible from the outside for the external logistics area (14) and for the conveyor device (16) located there and internally within the station for the conveying device (36). The components can be fed via this to the manufacturing cells (7, 8) and the process areas thereof. The receiving areas (40) may extend between the interfaces (32, 33) and the accesses (35) thereof.

Figure 4:
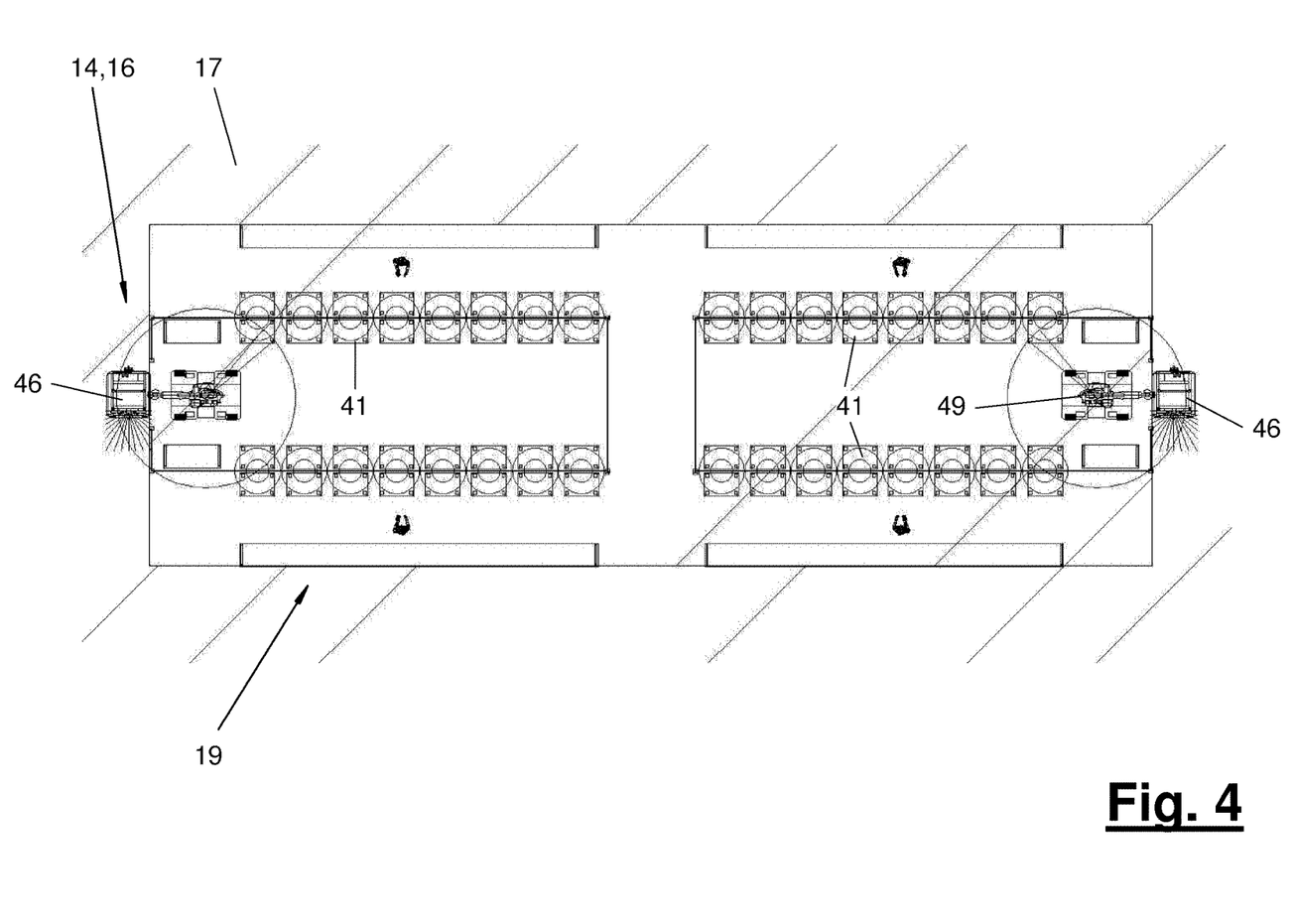
FIG. 4 is a schematic view of a component supply unit.

The components may originate from an external component supply unit (19) and fed via the aforementioned conveyor device (16) and positioned in the receiving area (40). Such a component supply unit (19) is shown in FIG. 4. It contains a magazine for components, especially component carriers (41) equipped therewith, which are loaded by means of loading robots (49) onto the conveyor device (16) moving in the external logistics area (14).

A plurality of the above-described uniform and standardized manufacturing stations (2) may be arranged in the aforementioned manufacturing plant (1). There are preferably a plurality of 10, 20 or more standard modules (2). They are arranged in a preset mutual association, and this is preferably a regular station matrix (5), as it is shown as a detail in FIGS. 5 and 6.

Figure 2:
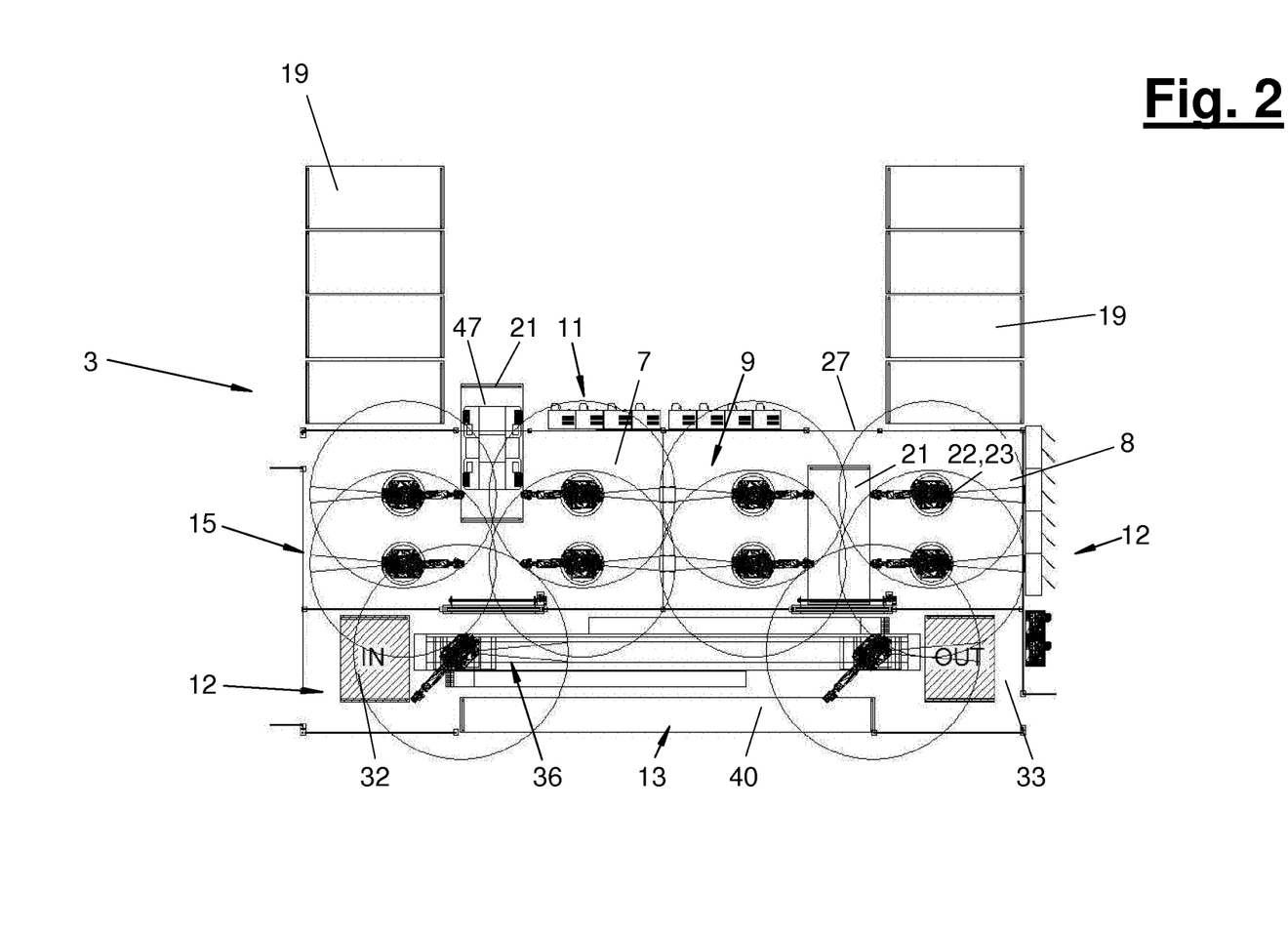
FIG. 2 is a schematic view of a manufacturing station for a special manufacture.

In addition, one or more additional manufacturing stations (3, 4) may be arranged in the manufacturing plant (1) and integrated in the logistics (14) and the conveyor device (16). FIG. 2 shows for this the example of a manufacturing station (3), which is intended for a special manufacture of workpieces (6). These may be, e.g., prototypes, niche products, small series or the like.

The special manufacturing station (3) may have the same above-described configuration as the standardized manufacturing station (2). In addition, different adaptations to the needs of a special manufacture may be provided. On the one hand, a non-stationary receiving device (21) may be used, which can be replaced when needed and which can be inserted into and removed from the process area (9) of a manufacturing cell (7, 8), e.g., through a closable (44) access (27). The access (27) is located at an outer border (15) and is arranged on a rear side of the station, which side is located opposite the outer front (13). Such a non-stationary receiving device (21) may also be used, as an alternative, in the standardized manufacturing station (2).

The non-stationary receiving device (21) can be conveyed by means of a suitable conveying device, especially a floor-mounted conveying device (45) and deposited and picked up in a preset position within the respective process area (9). Such a floor-mounted conveying device (45) may be configured, e.g., as an omnidirectionally movable conveying device (47) according to EP 2 137 053 B1, which will hereinafter be called Omnimove. Such an Omnimove (47) may be remotely controlled or travel over a preprogrammed travel path independently.

Further, the special manufacturing station (3) may have a directly associated, especially attached component supply unit (19), which may optionally be present as a plurality of units and is connected to the respective process area (9) of a manufacturing cell (7, 8). Moreover, the same above-described connection to an external logistics area (14) may be present on the outer front (13).

Figure 3:
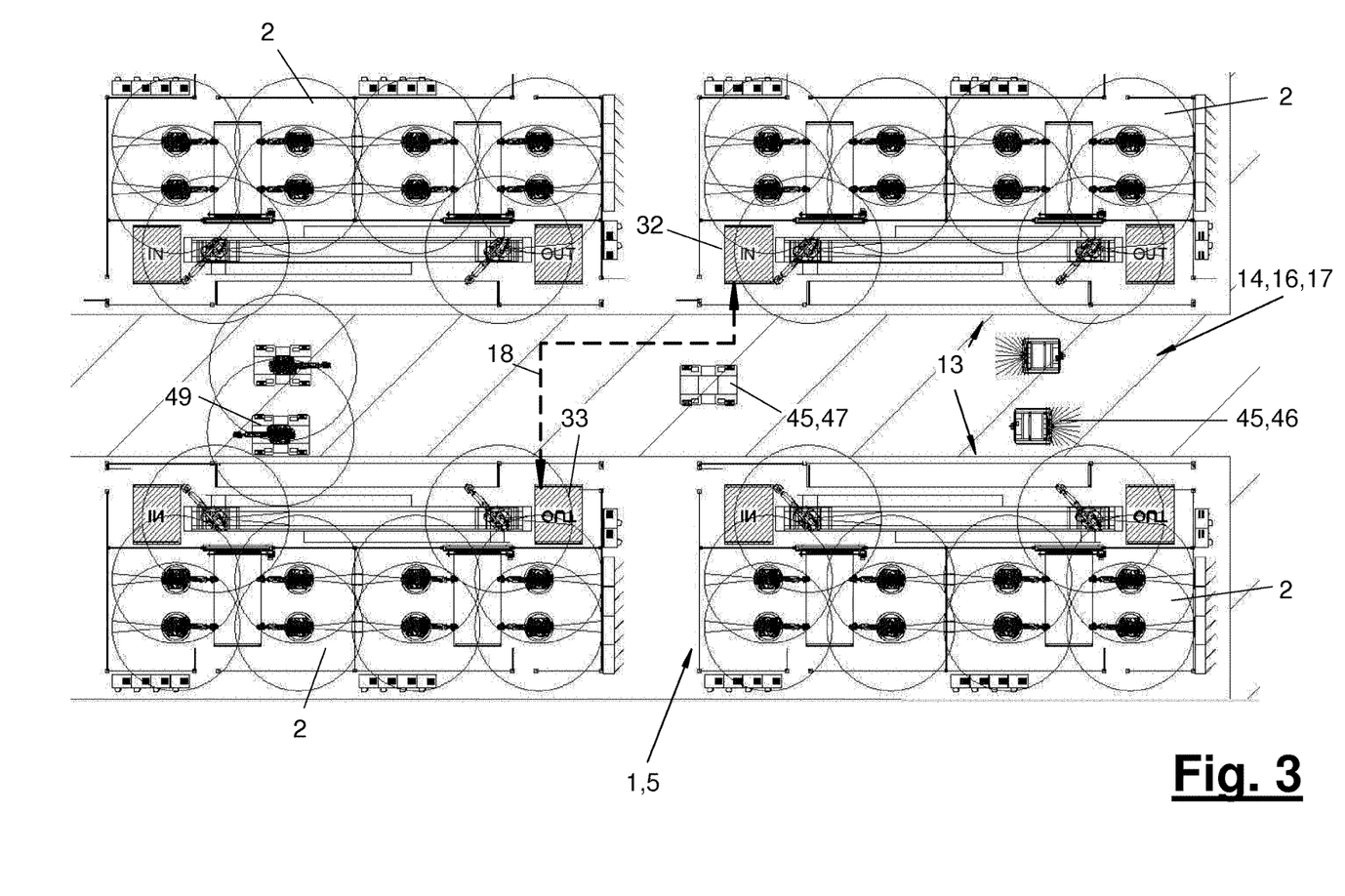
FIG. 3 is a detail of a manufacturing plant and of a station matrix with a plurality of manufacturing stations and conveyor device.
Figure 5:
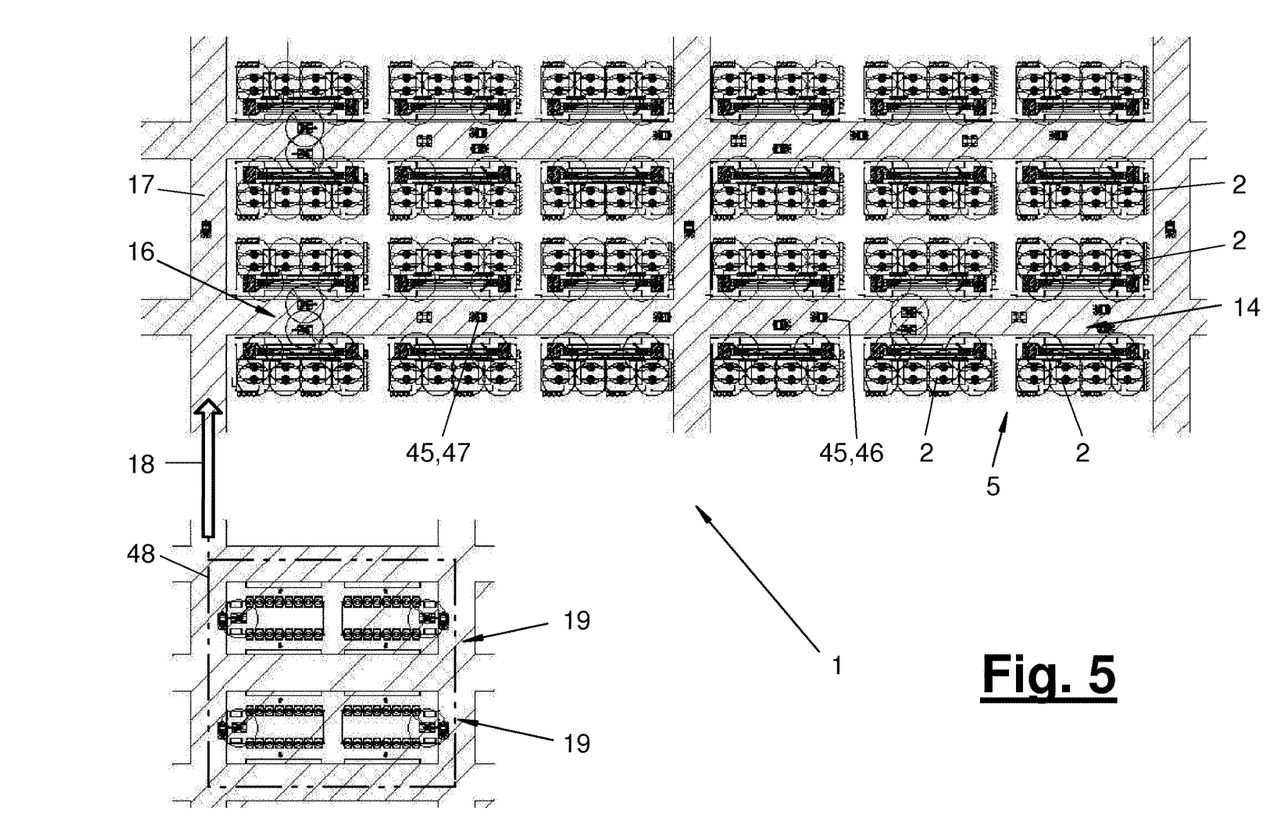
FIG. 5 is a detail view of a manufacturing plant and of a station matrix interlinked with a component supply unit.

FIGS. 3 and 5 illustrate the manufacturing plant (1) and the connection of the standardized manufacturing stations (2) to the external logistics (14) and to the conveyor device (16) located there. The external logistics (14) has a path network (17), on which the external conveyor device (16) travels. The path network (17) comprises a plurality of mutually intersecting conveying paths. The standardized manufacturing stations (2) face each and are connected to the path network (17) with their outer fronts. The rear sides of the manufacturing stations (2) face each other in the regular station matrix (5), One or more of the above-described special manufacturing stations (3) can also be integrated in a similar manner.

The conveyor device (16) may be floor-mounted and/or mounted on pillars. It may have floor-mounted conveying devices (45) and/or track-based conveying devices (48), e.g., a suspension conveyor. Automated and programmable floor-mounted conveying devices (45) and/or track-based conveying devices (48) are preferably used. These connect the input and output interfaces (32, 33) of different manufacturing stations (2) to one another. They can travel through the accesses (35) to the storage sites (34). Further, they can establish the connection to an external component supply unit (19) shown in FIG. 5. The manufacturing stations (2, 3) thus have a shared external logistics area (14) and an interlinking (18) for conveying in the station matrix (5). In addition, there may be an interlinking for data exchange as well as an interlinking of the stations (2, 3) and the conveyor device (16) for programming.

The floor-mounted conveying devices (45) and/or track-based conveying devices (48) preferably have a drive of their own and can be controlled individually. In particular, the floor-mounted conveying devices (45) may be steerable. They can seek and follow their path by means of guide devices, e.g., inductive guides, or with an orientation of their own by means of camera systems, GPS, sensory detection of the surrounding area or the like. The floor-mounted conveying devices (45) and/or track-based conveying devices (48) can preferably reach each manufacturing station (2, 3, 4) and the component supply unit (19) in the path network (17) of the manufacturing plant (1).

The conveyor device (16) may have a conveying line system, in which the automatic conveying devices (45, 48) travel in a line-bound manner. They can move between manufacturing stations (2, 3, 4) that are interlinked with one another for process engineering and optionally to the component supply unit (19). The conveying line system can be divided into a plurality of conveying lines closed in a ring-shaped manner, in which one or more conveying devices each travel in a line-bound manner and preferably in a closed circuit. The interlinking (18) of the manufacturing stations (2) located obliquely opposite each other, which is shown in FIG. 3, may be a part of such a conveying line. One or more manufacturing stations (2, 3, 4) may be connected to the conveying line. One or more conveying lines may exist within the logistics area (14) and the conveyor device (16). Further, a plurality of conveying lines may be interlinked, the interlinking and the transfer of workpieces taking place, e.g., at a shared station, e.g., a manufacturing station (2, 3).

FIG. 3 illustrates different embodiments for floor-mounted conveying devices (45). These may be configured, on the one hand, as an Omnimove (47). Larger and heavier workpieces (6) and optionally also other loads, e.g., robots, can be conveyed on these. Further, floor-mounted conveying devices (45) may be configured as freely programmable and self-propelled transport vehicles (46), so-called FTS or automated guided vehicle system or AGV (automated guided vehicle). In addition, it is possible to use self-propelled loading robots (49) or loading robots (49) arranged on an Omnimove (47). The paths or tracks in the path network (17) may be arranged in a regular grid. They may be so broad that a plurality of floor-mounted or track-based conveying devices (45, 48) can be moved in oncoming traffic.

Figure 6:
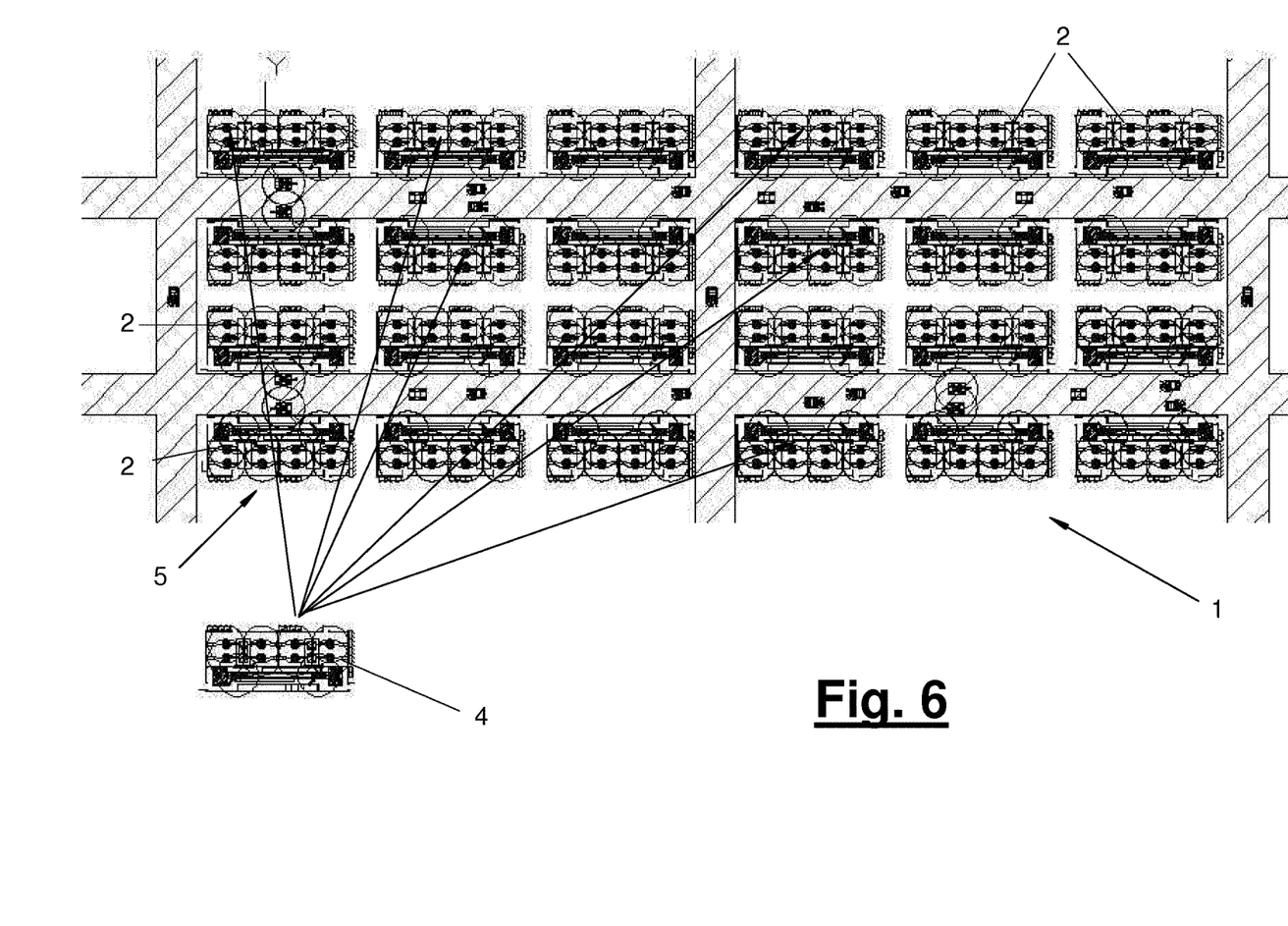
FIG. 6 is a view of a manufacturing station for the tryout and its integration in terms of programming to manufacturing stations in a manufacturing plant and in a station matrix.

As is illustrated in FIG. 6, the manufacturing plant (1) may also have a manufacturing station (4) for tryout, which is used to bring about a process-specific adaptation of the station on the basis of a uniform basic configuration and the uniform basic programming. The tryout station (4) may have for this the same basic configuration as the above-described uniform manufacturing station (2) shown in FIG. 1. The tryout station (4) is connected to the manufacturing stations (2) in the manufacturing plant (1) by cabled or wireless data lines, which make it possible to transmit the data of the process programming developed in the tryout station (4).

Thus, a specific process programming can be developed and tested in the tryout station (4) for each of the standardized manufacturing stations (2), and the particular process tooling (25, 38) is used as well. This development and testing may take place during the series operation of the manufacturing plant (1), and the data of the process programming can be stored, if needed, in the tryout station (4) or optionally in the particular control area (10) of the manufacturing stations (2). When retrofitting the manufacturing plant (1) and some or all manufacturing processes, the new process programming can be installed in a short time and immediately implemented in the manufacturing station (2) in question in connection with a correspondingly replaced process tooling (25, 38). A corresponding procedure is also possible in the special manufacturing stations (3).

The tryout station (4) may be provided as an additional station in the manufacturing plant (1) and may be used for these development and testing purposes only. As an alternative, it may be integrated in the series manufacture and configured for this corresponding to the manufacturing station (2, 3), and it is uncoupled from the network of stations only temporarily for the tryout operation.

Various modifications of the embodiments shown and described are possible. In particular, the features of the different exemplary embodiments and of the variants mentioned may be combined with one another and also replaced with one another as desired.

The manufacturing stations (2, 3, 4) have a rectangular outline and a linear orientation of the manufacturing cells (7, 8) and of the internal conveying logistics (12) of the station in the preferred embodiments. As an alternative, another, e.g., bent or ring-shaped arrangement and orientation is possible. Manufacturing stations other than the above-described ones may also be integrated within a manufacturing plant (1). These may be conventional stations.

While specific embodiments of the invention have been shown and described in detail to illustrate the application of the principles of the invention, it will be understood that the invention may be embodied otherwise without departing from such principles.

The invention claimed is:
1. A manufacturing plant comprising:
  a plurality of mutually uniform manufacturing stations each of the manufacturing stations comprising:
    a modular configuration;
    a plurality of integrated manufacturing cells each having a separate process area as a portion of each of the manufacturing cells, wherein each of the separate process areas have a mutually uniform basic configuration, and each of the separate process areas comprises a uniform receiving device with process tooling comprising support and positioning devices and controllable clamping devices for clamping one or more workpieces for receiving workpieces and jointing received workpieces and, a plurality of uniformly positioned and set up robot workplaces on a periphery of each uniform receiving device and besides and at different sides of each uniform receiving device, each of the plurality of integrated manufacturing cells having the manufacturing cells lined up with the uniform receiving devices lined up;
    a shared conveying logistics within the uniform manufacturing station, the shared conveying logistics comprising a conveying device for conveying the workpieces within the uniform manufacturing station and connecting the manufacturing cells to one another and the shared conveying logistics further comprising an input/output interface comprising an input interface and an output interface located at a spaced location from the input interface, the input/output interface being configured to feed workpieces to and remove the workpieces from the uniform manufacturing station for connecting the manufacturing cells together and connecting the manufacturing cells to a surrounding area, the conveying logistics extending within the uniform manufacturing station along the lined up manufacturing cells and being arranged between the lined up manufacturing cells and an outer front of the manufacturing station; and
    a border, which border surrounds the manufacturing cells within the uniform manufacturing station and surrounds the conveying logistics within the uniform manufacturing station, wherein the border is disposed on an outside of the uniform manufacturing station, each border comprising a wall, which forms a protective separation of an interior of each manufacturing station with respect to the surrounding area outside of each manufacturing station, wherein the border has a plurality of closable access locations and the input/output interface is configured with the input interface cooperating with one of the closable access locations and the output interface cooperating with another of the closable access locations to feed and remove the workpieces between the manufacturing cells and between the interior of the uniform manufacturing station and the surrounding area of the uniform manufacturing station through the closable access locations of the uniform manufacturing station;
  a shared external logistics area, the shared external logistics area being external of each border of each of the plurality of mutually uniform manufacturing stations with the outer front of each of the uniform manufacturing stations facing the shared external logistics area;
  a path network comprising a plurality of mutually intersecting and floor located conveying paths external of the border of each of the plurality of mutually uniform manufacturing stations;
  a component supply unit; and
  a conveyor device for travel on the conveying paths, each of the plurality of mutually uniform manufacturing stations being connected to the shared external logistics area with the conveyor device, the conveyor device comprising a plurality of conveying devices configured to travel on the path network connecting the input and output interfaces of different manufacturing stations to one another and connecting to the component supply unit, wherein one of the closable access locations of each border allows for access of the conveying devices through the wall from outside of the border to the input interface within the border and one of the closable access locations of each border allows for access of the conveying devices through the wall from outside the border to the output interface within the border.

2. A manufacturing plant in accordance with claim 1, wherein the manufacturing stations are arranged and interlinked in a station matrix.

3. A manufacturing plant in accordance with claim 2, wherein:
the manufacturing stations in the station matrix have an interlinking for data exchange as well as for programming; and
a plurality of manufacturing stations are interlinked in the station matrix for process engineering.

4. A manufacturing plant in accordance with claim 2, wherein the manufacturing stations in the station matrix have an interlinking for conveying and for data exchange as well as for programming.

5. A manufacturing plant in accordance with claim 1, wherein the process area of each of the cells is formed with a basic standardized configuration of the manufacturing station and is provided with a single PLC operating system, and receives a process tooling and configured programming for configuration and process adaptation thereof and the manufacturing stations are provided interlinked in a station matrix with the conveyor device interlinking the stations.

6. A manufacturing plant in accordance with claim 1, further comprising:
loading robots, wherein the component supply unit contains a magazine for components or for component carriers equipped therewith, which are loaded by means of the loading robots onto the conveyor device moving in the shared external logistics area.

7. A manufacturing plant in accordance with claim 6, wherein the conveying logistics within the station has a receiving area on the outer front for receiving the component carriers, which receiving area is accessible from outside the border area by the external logistics area, and which receiving area allows access of the conveying device from outside the border to within the uniform manufacturing station.

8. A manufacturing plant in accordance with claim 1, wherein the conveying device is arranged between the spaced apart input interface and the output interface.

9. A manufacturing plant in accordance with claim 1, wherein the conveying device comprises a plurality of industrial robots with a travel axis.

10. A manufacturing plant in accordance with claim 1, wherein uniformly configured industrial robots are arranged at the robot workplaces.

11. A manufacturing plant in accordance with claim 1, wherein:
the robot workplaces each have an uniform position specification for an industrial robot relative to the uniform receiving device;
the uniform position specification is formed by bottom-side guide and mounting sites, which ensure a preset, accurate positioning and alignment of the industrial robot arranged relative to the uniform receiving device.

12. A manufacturing plant in accordance with claim 1, wherein:
the uniform receiving devices of the manufacturing cells have a stationary or non-stationary configuration and are connected to the conveying device of the conveying logistics within the station; and
at least one of the closable access locations is for a non-stationary receiving device on a rear side located opposite the outer front.

13. A manufacturing plant in accordance with claim 1, further comprising uniformly configured industrial robots arranged at the robot workplaces, wherein the process tooling comprises industrial robot process tools associated with one or more of the uniformly configured industrial robots, the industrial robot process tools being configured for welding or gluing/bonding.

14. A manufacturing plant in accordance with claim 1, wherein each of the conveying devices comprises an individually driven and individually controllable floor located conveying device provided and configured as an automated freely programmable and self-propelled transport vehicle comprising a drive of its own and being independently steerable and configured to travel on the path network connecting the input and output interfaces of different manufacturing stations to one another and connecting to the component supply unit.

15. A manufacturing plant in accordance with claim 14, wherein the conveyor device has a conveying line system, along which the conveying devices travel line-bound along the conveying line system and the conveying line system has a plurality of conveying lines closed in a ring-shape, along which one or more of the conveying devices travel line-bound in a closed circuit.

16. A manufacturing plant in accordance with claim 1, wherein the conveyor device has a conveying line system, along which the conveying devices travel line-bound along the conveying line system and the conveying line system has a plurality of conveying lines closed in a ring-shape, along which one or more of the conveying devices travel line-bound in a closed circuit.

* * * * *